United States Patent [19]

Champlin et al.

[11] 4,372,763

[45] Feb. 8, 1983

[54] AIR FILTER ASSEMBLY

[75] Inventors: Charles L. Champlin, Rittman; John T. Misura, Wadsworth, both of Ohio; Carl J. Reiser, Ada, Mich.

[73] Assignee: Packaging Corporation of America, Evanston, Ill.

[21] Appl. No.: 248,697

[22] Filed: Mar. 30, 1981

[51] Int. Cl.³ .............................................. B01D 46/10
[52] U.S. Cl. ...................................... 55/501; 55/511; 55/DIG. 31
[58] Field of Search ................. 55/501, 511, DIG. 31; 52/656, 658; 229/34 B, 41 B; 160/377; 40/154, 155

[56] References Cited

U.S. PATENT DOCUMENTS

| | | | |
|---|---|---|---|
| 2,519,831 | 8/1950 | Frankenstein | 229/34 B |
| 2,646,915 | 7/1953 | Bockman | 229/34 B |
| 2,686,001 | 8/1954 | Arneson | 229/34 B |
| 2,988,169 | 6/1961 | Klein | 55/502 |
| 3,005,516 | 10/1961 | Klein | 55/509 |
| 3,023,839 | 3/1962 | Best | 55/DIG. 31 |
| 3,154,393 | 10/1964 | Klein et al. | 55/501 |
| 3,603,500 | 9/1971 | Dutcher | 229/41 B |
| 3,830,045 | 8/1974 | Copenhefer | 55/501 |
| 3,938,973 | 2/1976 | Kershaw | 55/501 |
| 3,970,440 | 7/1976 | Copenhefer et al. | 55/501 |
| 4,086,071 | 4/1978 | Champlin | 55/501 |

*Primary Examiner*—David L. Lacey

*Attorney, Agent, or Firm*—Neuman, Williams, Anderson & Olson

[57] ABSTRACT

An air filter assembly is provided which comprises a compressible air pervious multi-sided filter panel and a frame therefor, the latter being adjustable from a collapsed first mode to an operative second mode. The frame of foldable sheet material includes a foraminous center section in supporting engagement with the filter panel; a marginal section delimiting the center section; and a plurality of elongated peripheral sections arranged in alternate pairs and foldably connected to an coacting with the marginal section and with each other to form a hollow verge encompassing the filter panel periphery when the frame is in the second mode. The peripheral sections form a substantially flat multiply flange overlapping and compressing the filter panel periphery when the frame is in the first mode. A first pair of alternate peripheral sections have the opposite end portions thereof overlying corresponding end portions of a second pair of alternate peripheral sections when the frame is in the first mode. When the frame is adjusted from the first mode to the second mode, the overlapped end portions of the second pair of alternate peripheral sections will abuttingly engage at an angle the corresponding end portions of the first pair of alternate peripheral sections and restrain movement of the frame from the second mode to the first mode.

4 Claims, 10 Drawing Figures

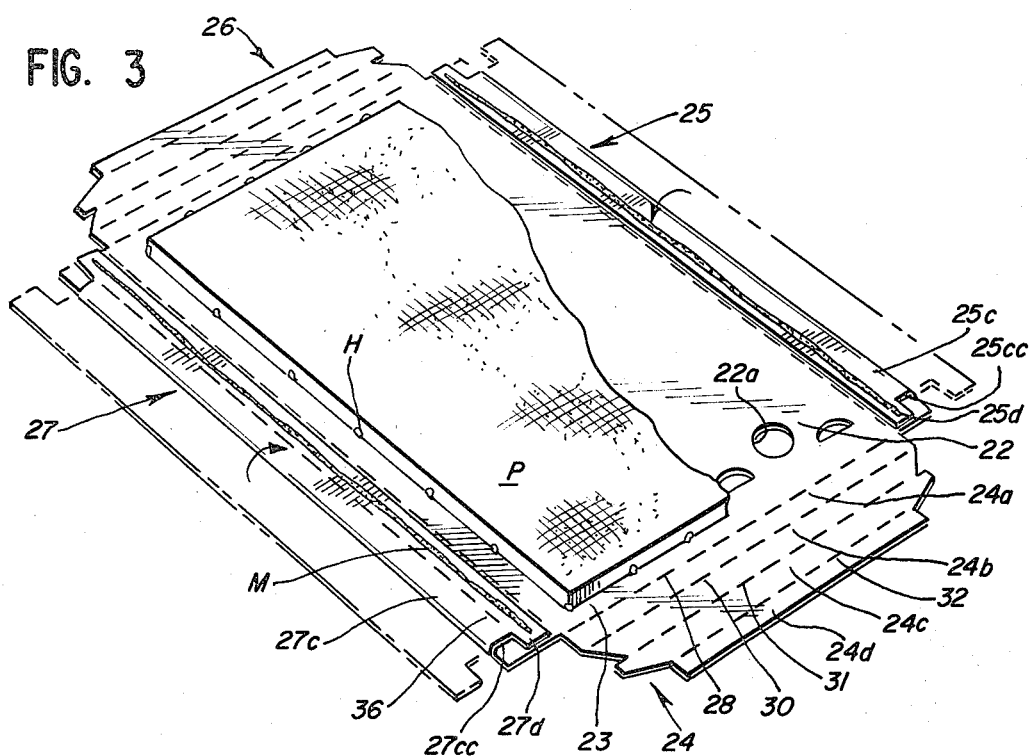
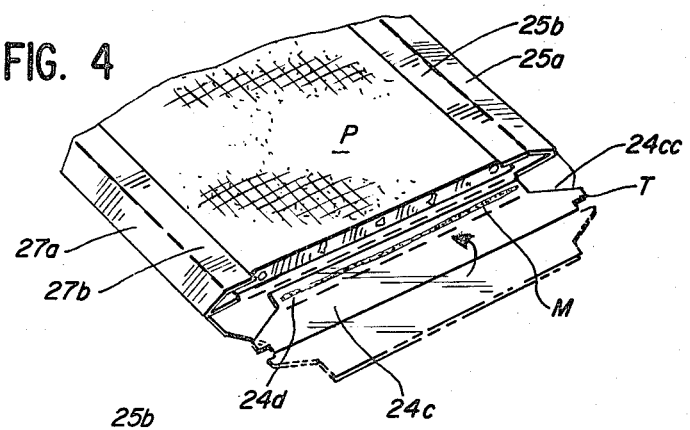
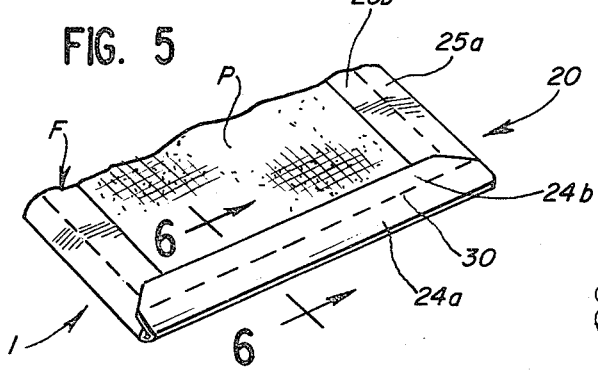
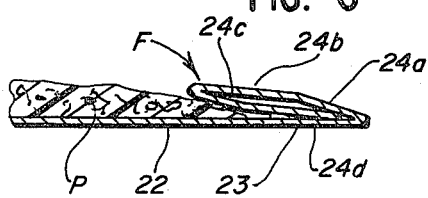

FIG. 7
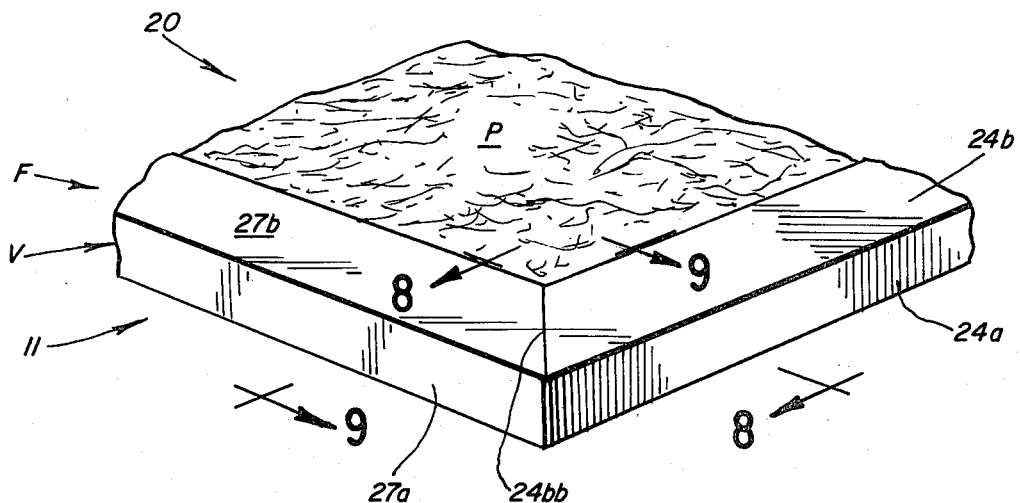
FIG. 8
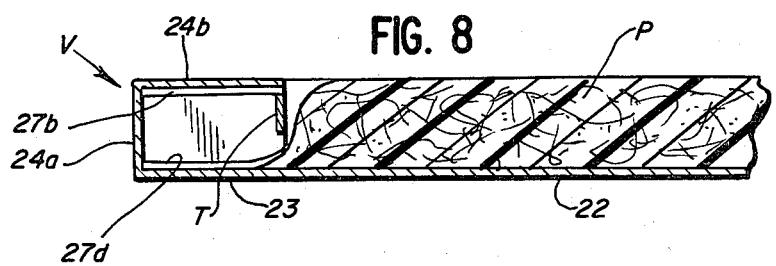
FIG. 9
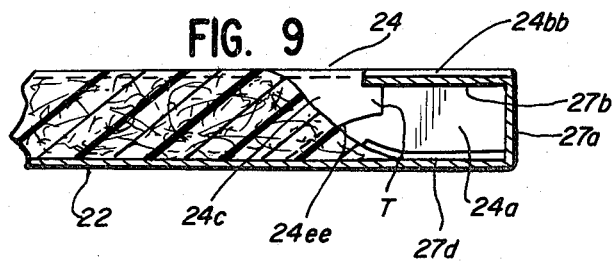
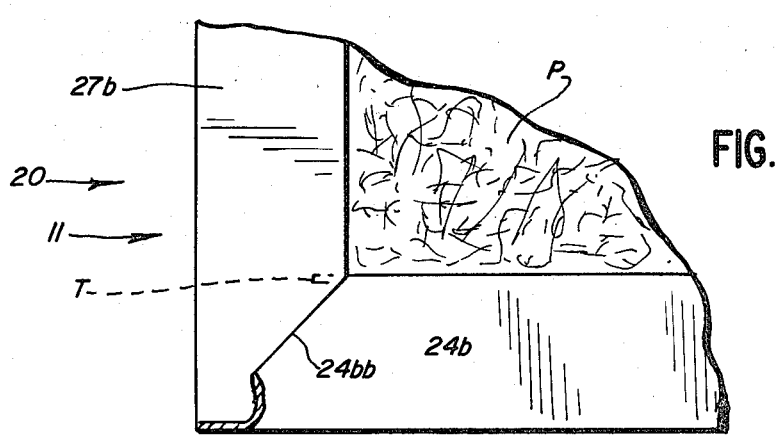
FIG. 10

AIR FILTER ASSEMBLY

BACKGROUND OF THE INVENTION

Various types of air filter assemblies have heretofore been utilized; however, because of certain inherent design characteristics they have been beset with one or more of the following shortcomings: (a) the assembly included numerous components and thus was difficult, costly, and awkward to assemble; (b) the assembly was inherently weak and required special handling; (c) the assemblies could not be effectively compressed together so as to form a compact bundle for shipment or storage; and (d) special equipment and/or an inordinate amount of manual labor was required to form the assembly.

SUMMARY OF THE INVENTION

Thus, it is an object of the invention to provide an improved air filter assembly which avoids all of the aforenoted shortcomings.

It is a further object to provide an improved air filter assembly which may be readily assembled with high-speed automatic equipment.

It is a further object to provide an improved air filter assembly having a frame which is formed from a single, inexpensive blank of foldable sheet material.

It is a still further object to provide an improved filter assembly having a sturdy frame on which a filter panel is mounted and which provides minimum obstruction of the air flow through the filter panel.

Further and additional objects will appear from the description, accompanying drawings, and appended claims.

In accordance with one embodiment of the invention, an improved air filter assembly is provided which includes a compressible, air pervious multi-sided filter panel, and a frame for supporting the filter panel and which is adapted to be manually adjusted from a collapsed first mode to an operative second mode. The frame includes a foramious center section on which the filter panel is mounted. A marginal section delimits the center section and has an inner portion contiguous to the center section and secured to peripheral portions of the filter panel. Foldably connected to outer portions of the marginal sections are a plurality of peripheral sections arranged in alternate pairs. The peripheral sections coact with the marginal section and with each other to form a hollow, substantially continuous verge which encompasses the filter panel periphery, when the frame is in the operative second mode. When the frame is in the collapsed first mode, the peripheral sections form a substantially flat multi-ply flange which overlaps and compresses the filter panel periphery. While the frame is in a collapsed first mode, a first pair of alternate peripheral sections is disposed so that the opposite end portions thereof overlie corresponding end portions of a second pair of alternate peripheral sections. When the frame is manually adjusted from the collapsed first mode to the operative second mode, the end portions of the second pair of alternate peripheral sections will abuttingly engage at an angle the corresponding end portions of the first pair of alternate peripheral sections and restrain movement of the frame from the second mode back to the first mode.

DESCRIPTION

For a more complete understanding of the invention reference should be made to the drawings, wherein:

FIG. 1 is a top plan view of one embodiment of a blank for a frame, which forms one component of the improved air filter assembly, and showing the filter panel mounted thereon; the undersurface of certain portions of the blank are shown coated with a suitable adhesive or the like.

FIG. 3 is a perspective top view similar to FIG. 2, but showing one pair of peripheral sections of the frame following an initial folding step.

FIG. 4 is a fragmentary perspective top and view of the assembly of FIG. 3, following successive folding steps.

FIG. 5 is a fragmentary perspective top end view of the assembly in a collapsed first mode.

FIG. 6 is an enlarged fragmentary sectional view taken along line 6—6 of FIG. 5.

FIG. 7 is an enlarged fragmentary perspective top corner view of the assembly in an operative second mode.

Figure 1:
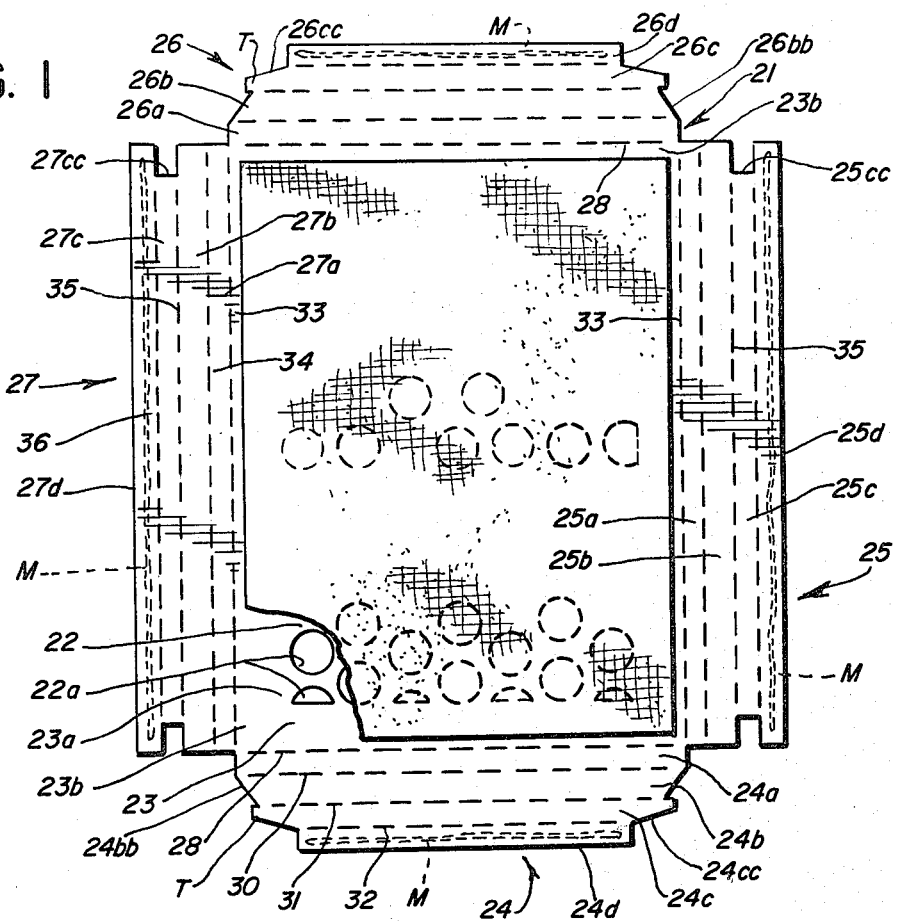

FIGS. 8 and 9 are enlarged fragmentary sectional views taken respectively along lines 8—8 and 9—9 of FIG. 7.

FIG. 10 is an enlarged fragmentary top plan view of the corner of the assembly shown in FIG. 7 and with a segment of the overlying end portion of one of the peripheral sections removed to partially expose the concealed end portion of a second peripheral section.

Referring now to the drawings and more particularly to FIGS. 5 and 7, one form of the improved air filter assembly 20 is shown which is adapted to be used in forced air heating, ventilating, and air conditioning systems. The dimensions of the assembly may vary and will be dictated by the configuration of the location of the assembly in the system.

The assembly 20 comprises only two components; namely, a multi-sided compressible filter panel or pad P, and a frame F for supporting the panel P. The panel P is of conventional construction and may be formed of any one of a number of materials utilized for this purpose. For example, it may consist of glass fibers held in a very porous mass by a thermoset binder, e.g., phenol formaldehyde solution extended twenty percent with an emulsion of VINSOL, a rosin derivative. The surfaces of the panel are normally sprayed with a non-drying, non-volatile mineral oil. The filter panel P per se forms no part of the invention hereinafter described.

The frame F is formed from a blank 21 of paperboard material having at least the exposed surface thereof treated so as to readily receive printed indicia or graphics. The blank, as seen in FIG. 1, includes a foraminous center section 22 which is strong enough to support the weight of the filter panel P and yet, at the same time will cause minimal resistance to the air flowing through the panel P. The shape, size, and relative arrangement of the openings 22a formed in the center section 22 may vary from that shown, if desired. The center section 22 should be of such stiffness that it will be distorted only a neglible amount when subjected to the normal air flow through the assembly.

The blank 21 is also provided with a marginal section 23 which delimits the center section 22 and is coplanar therewith. Section 23 is provided with an inner portion 23a contiguous to the center section and an outer portion 23b. The center section 22 approximates the peripheral configuration of the filter panel P and normally, at least, portions of the periphery of the filter panel P will engage the inner portion 23a of the marginal section 23 and will be secured thereto by adhesive H or some other suitable means.

Foldably connected to the outer portion 23b of the marginal section 23 are a plurality of peripheral sections 24, 25, 26, and 27 which are arranged in alternate pairs with peripheral sections 24, 26 being of substantially like configuration and peripheral sections 25, 27 also being of substantially like configuration.

Each section 24, 26 includes a corresponding elongate first panel 24a, 26a which is connected by foldline 28 with the outer portion 23b of marginal section 23. The first panel 24a, 26a has a length which is substantially coextensive with the outer portion 23b to which it is connected.

Connected by an elongated foldline 30 to first panel 24a, 26a is a second panel 24b, 26b. The opposite end edges 24bb, 26bb of the second panel converge outwardly and terminate at an elongated foldline 31, the latter connecting an elongated third panel 24c, 26c to the second panel.

The length of panel 24c, 26c is such that a tongue-like projection T extends endwise beyond each end of foldline 31. Except for the projections T, the end edges 24cc, 26cc converge abruptly outwardly from the projections and terminate at an elongated foldline 32 which connects a fourth panel 24d, 26d to the third panel. The fourth panel has applied to the underside thereof a suitable adhesive, indicated by stippling in FIG. 1. Foldlines 28, 30, 31, and 32 are disposed in spaced parallel relation.

As aforementioned, peripheral sections 25, 27 are preferably of like configuration and each includes an elongated first panel 25a, 27a which is coextensive with the adjacent outer portion 23b of marginal section 23 and is connected thereby by foldline 33. Connected by foldline 34 to the opposite side of first panel 25a, 27a is an elongated second panel 25b, 27b. As seen in FIG. 1, the first and second panels are preferably coextensive with one another.

A third panel 25c, 27c which has its opposite ends 25cc, 27cc recessed relative to the second panel ends, is connected to panel 25b, 27b by a foldline 35. A fourth panel 25d, 27d is connected by foldline 36 to the outer edge of third panel 25c, 27c. Second panel 25b, 27b and fourth panel 25d, 27d are of substantially like configuration.

When the blank is set up to form the frame F, the undersides of the fourth panels 24d, 26d of peripheral sections 24, 26 and the undersides of the fourth panels 25d, 27d of peripheral sections 25, 27 are coated with a suitable adhesive M or the like. Foldlines 33, 34, 35 and 36 are in parallel relation and are disposed transversely of the foldlines 28, 30, 31, and 32.

Figure 2:
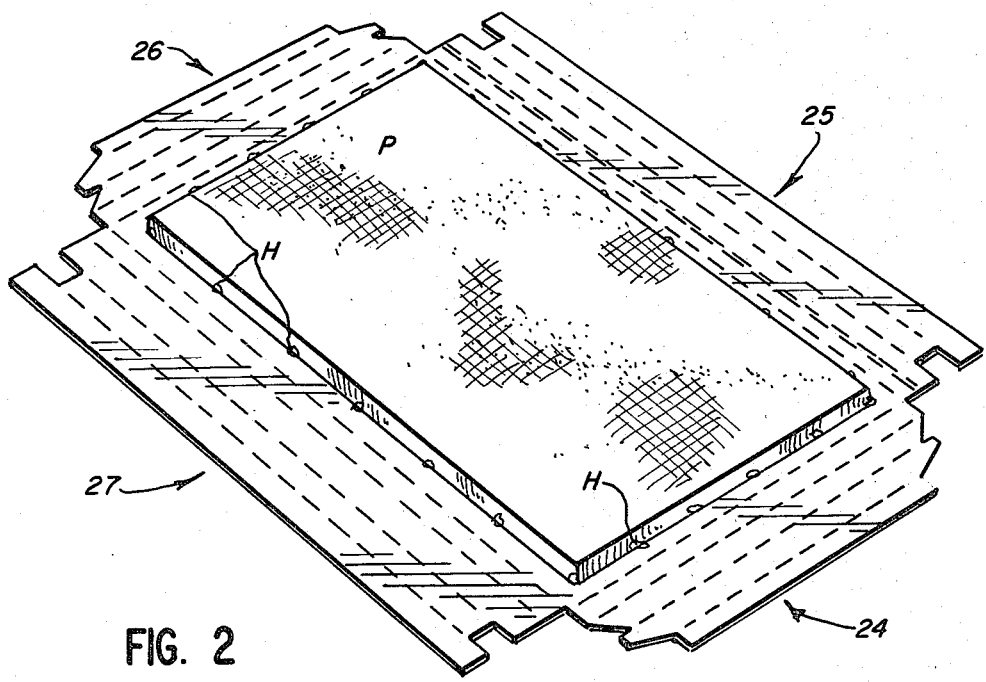
FIG. 2 is a perspective top view of the assembly as shown in FIG. 1.

In assembling the air filter assembly 20, the filter panel P is aligned with the center section 22 and preferably secured thereto by a suitable adhesive H being applied in dots along the periphery of the filter panel P, see FIG. 2. In most instances the periphery of the filter panel will overlie the inner portion 23a of the marginal section 23. Adhesive M is applied to the undersides of the panels 24d, 25d, 26d, and 27d of the peripheral section, either before or after the filter panel P is positioned on the blank center section 22.

After the filter panel has been located and the adhesive applied to the aforementioned panels of the peripheral section, the third and fourth panels 25c, 25d, and 27c, 27d of the peripheral sections 25, 27 are folded upwardly and inwardly as units about their respective foldlines 35 and assume the folded positions shown in FIG. 3. It will be noted that in such folded positions, the adhesively coated surfaces of the fourth panels 25d, 27d of the respective peripheral sections 25, 27 are facing upwardly. Furthermore, it will be noted that the free elongated edges of the fourth panels 25d, 27d are spaced from the periphery of the filter panel P.

Following this step, third and fourth panels 24c, 24d, and 26c, 26d of peripheral sections 24, 26 are folded upwardly and inwardly as units about foldlines 31 so that the adhesively coated surfaces of fourth panels 24d, 26d face upwardly. As in the case of coated panels 25d, 27d, the elongated free edges of panels 24d, 26d are spaced from the periphery of filter panel P.

Either before or after the third and fourth panels of peripheral sections 24, 26 have been folded about foldlines 31, as aforedescribed, the previously folded peripheral sections 25, 27 are folded upwardly and inwardly as units about foldlines 33, so that the adhesively coated surfaces of panels 25d, 27d will be adhesively secured to a surface of marginal section 23 and at the same time sandwich a peripheral portion of filter panel P between the inner portion 23a of the marginal section 23 and the corresponding fourth panel 25d, 27d.

Subsequent to peripheral sections 25, 27 being folded, as described, the remaining alternate pair of peripheral sections 24, 26 are folded in a like manner about their respective foldlines 28. It is important that the end portions of the first and second panels 24a, 24b, and 26a, 26b of peripheral sections 24, 26 overlie the corresponding end portions of the first folded peripheral sections 25, 27 when the frame F initially assumes the collapsed first mode I. The importance of this relationship becomes apparent when the frame F is manually adjusted from the first mode I (FIG. 5) to the operative second mode II (FIG. 7).

As will be noted in FIGS. 8–10, when the frame F is in the second mode, the corresponding end portions of the adjacent peripheral sections assume an abutting angular relationship and form a closed corner, see FIG. 7, with the second panels 24b, 26b overlapping the corresponding second panels 25b, 27b and thus, creating an attractive miter joint visual effect.

When the peripheral section end portions are disposed in abutting angular relation so as to form the closed corners (FIG. 7), the tongue-like projections T formed at the opposite ends of the third panels 24c, 26c of peripheral sections 24, 26 extend into pockets formed at the ends of the peripheral sections 25, 27 by reason of the recessed ends of third panels 25c, 27c. With the projections disposed in the pockets, the edges of panels 25b, 27b are held in place between the projections T and the respective panels 24b, 26b. Thus, the stable corners enhance the overall stiffness of the frame.

As seen in FIGS. 1 and 9, the ends of panel 24c, 26c are undercut at 24cc, 26cc so as to prevent interference between panels 24c, 26c and panels 25b, 27b, when the frame F is manually adjusted from the collapsed first mode to the operative second mode.

When the frame is disposed in the collapsed first mode I, as seen in FIG. 6, an inwardly projecting double-ply flange f is formed by the folded second and third panels of each peripheral section. In FIG. 6 only peripheral section 24 is shown. It will be noted that the flange f extends over a portion of the filter panel P and will compress same, when a plurality of the assemblies in a like mode, are stacked and compressed together to form a compact bundle, not shown, which is suitable for either storage or transporting to a customer a large number of assemblies.

When manually adjusting the frame from the collapsed first mode I to the operative second mode II, the multi-ply flanges f formed by the panels of peripheral sections 25, 27 are grasped and moved upwardly and away from each other until the third panels 25c, 27c of the peripheral sections assume transverse relation with respect to the marginal section 23 and are in substantially parallel relation with respect to each other. As the peripheral sections 25, 27 are being manually adjusted as described, the overlapped end portions of the second panels 25b, 27b will engage the overlapping end portions 24b, 26b of peripheral sections 24, 26 and cause the latter to simultaneously pivot and the third panels 24c, 26c thereof to automatically assume a transverse relation with respect to the marginal section 23. As the latter reach this transverse relation, the projections T carried at the ends of the third panels 24c, 26c will automatically slide under the end portions of the second panels 25b, 27b of peripheral sections 25, 27 and capture same between the projections T and the second panels 24b, 26b of the peripheral secctions 24, 26, see FIGS. 8-10.

In the illustrated embodiment, the frame F, when in the second mode, forms a substantially continuous hollow (tubelike) verge V which completely encompasses the periphery of the filter panel P. The verge is defined by the first and third panel of each peripheral section being disposed in parallel spaced relation and substantially perpendicular to the plane of the marginal section 23, and the second and fourth panels being disposed in substantially parallel spaced relation and substantially perpendicular to the first and third panels. Where the fourth panels engage and compress a portion of the filter panel periphery, the fourth panels might be in a slightly non-parallel relation with respect to the corresponding second panels.

The verge V does not interfere with the air flow through the filter panel and yet, at the same time, the exposed surfaces of the first and second panels and of the marginal section provide desirable areas for printed indicia and graphics. The increased stiffness and the relative width of the verge significantly facilitates handling of the assembly when the latter is being installed in the heating, ventilating, and/or air conditioning unit. Furthermore, no tools are required to adjust the frame to its operative mode and the assembly, while in the collapsed first mode, may be conveniently stored by the customer until it is to be installed. When the assembly is being used, the foraminous center section 22 of the frame should be disposed on the downstream side of the filter panel, thus, deformation of the panel P beyond the plane of the center section 22 by reason of the air flow through the panel is, in most instances, eliminated or insignificant. The frame prevents the air flow from circumventing the filter panel.

The size, shape, and thickness of the assembly may vary from that shown without departing from the scope of the invention herein disclosed and claimed.

We claim:

1. An air filter assembly comprising a compressible air pervious multi-sided filter panel, and a multi-sided frame in supporting engagement therewith and having a periphery thereof adjustable from a collapsed first mode to an operative second mode; said frame being formed from a single blank of foldable sheet material and including a foraminous substantially planar center section having a concealed surface thereof in supporting face-to-face engagement with one surface of said filter panel, the frame periphery including a marginal section delineating said center section and being substantially coplanar therewith, said marginal section having inner portions connected to said center section and outer portions to which a plurality of elongated peripheral sections are foldably connected, said peripheral sections constructed and arranged with respect to one another so as to substantially delimit said marginal section and being arranged in first and second alternate pairs, said peripheral sections constructed and arranged with each other and said marginal section to form a substantially continuous hollow verge encompassing only the periphery of said multi-sided filter panel which extends over the marginal section when said frame periphery is in said operative second mode; when said frame periphery is in said inoperative first mode, each of said peripheral sections being independently folded inwardly towards said filter panel and forming a substantially flat multi-ply flange overlapping peripheral portions of the filter panel and compressing same between said flange and said center section, said folded peripheral sections when said frame periphery is in said inoperative first mode being disposed within an area defined by said marginal section outer portions, each of said peripheral sections being provided with a plurality of foldably connected elongated panels, the first pair of alternate peripheral sections having opposite end portions of certain elongated panels thereof overlying corresponding end portions of certain elongated panels of the second pair of alternate peripheral sections when said frame periphery is in said first mode; the overlapped panel end portions of the second alternate pair of peripheral sections being disposed in angular abutting corner-forming relation with the adjacent panel end portions of said first alternate pair of peripheral sections, when the frame periphery is in said operative second mode and restraining movement of said frame peripheral sections from said second mode to said first mode; each of said peripheral sections, when said frame periphery is in said operative second mode, having adjacent foldably connected elongated panels in angular relation and alternate panels in opposed relation; one of the panels having a substantial portion thereof affixed to an adjacent portion of the marginal section and remaining affixed thereto when said frame periphery is moved from said inoperative first mode to said operative second mode.

2. The air filter assembly of claim 1 wherein each of said peripheral sections includes a plurality of foldably connected panels, certain panels being inner and outer side panels and disposed in spaced, opposed, substantially parallel relation and substantially normal to the plane of said marginal section and certain other of said panels being exterior and interior panels disposed in spaced, opposed, substantially parallel relation and substantially spanning the distance between said inner and outer side panels, said exterior panel being in spaced, substantially parallel, substantially coextensive relation with a segment of the marginal section, when said frame periphery is in said operative second mode.

3. The air filter assembly of claim 2 wherein the interior panel of each peripheral section is disposed beneath the exterior panel and is fixedly secured to and compresses a narrow peripheral segment of said filter panel against the marginal section; when the frame periphery assumes the operative second mode, the inner side panels of said peripheral sections constructed and arranged with respect to each other so as to define an area of the filter panel through which air may flow.

4. The air filter assembly of claim 3 wherein the inner side panels of the first pair of alternate peripheral sections have opposite end portions thereof provided with integral endwise extending non-folded projections and the inner side panels of the second pair of alternate peripheral sections have opposite end portions thereof provided with pocket-forming recesses; each projection while in a non-folded state being inserted into a corresponding recess when said frame periphery assumes an operative second mode.

* * * * *